(12) United States Patent
Arnstein (10) Patent No.: US 9,103,381 B2
(45) Date of Patent: Aug. 11, 2015

(54) CARRIER RING FOR AN ENCODER

(71) Applicant: LEINE & LINDE AB, Straengnaes (SE)

(72) Inventor: Richard Arnstein, Straengnaes (SE)

(73) Assignee: LEINE & LINDE AB, Straengnaes (SE)

( * ) Notice: Subject to any disclaimer, the term of this patent is extended or adjusted under 35 U.S.C. 154(b) by 0 days.

(21) Appl. No.: 13/887,877

(22) Filed: May 6, 2013

(65) Prior Publication Data

US 2013/0296062 A1 Nov. 7, 2013

(30) Foreign Application Priority Data

May 4, 2012 (SE) .................................... 1250454-4

(51) Int. Cl.
| | | |
|---|---|---|
| G01B 7/14 | (2006.01) | |
| F16D 3/12 | (2006.01) | |
| G01P 1/02 | (2006.01) | |
| G01D 5/244 | (2006.01) | |
| G01D 5/347 | (2006.01) | |

(52) U.S. Cl.
CPC ............... *F16D 3/12* (2013.01); *G01D 5/24442* (2013.01); *G01D 5/34738* (2013.01); *G01P 1/026* (2013.01)

(58) Field of Classification Search
USPC ........ 464/23, 29, 41, 89; 324/207.11, 207.12, 324/207.21; 310/156.16; 74/573.121; 235/116; 250/231.18
See application file for complete search history.

(56) References Cited

U.S. PATENT DOCUMENTS

| | | | |
|---|---|---|---|
| 3,761,114 A * | 9/1973 | Blakeley | |
| 3,774,675 A * | 11/1973 | Yoshiro | ........................ 464/41 X |
| 3,871,668 A * | 3/1975 | Coker et al. | |
| 6,508,140 B2 * | 1/2003 | Zaps | |
| 7,019,515 B2 * | 3/2006 | Sentoku | ................ 324/207.11 X |
| 7,795,771 B2 * | 9/2010 | Lott et al. | .............. 324/207.11 X |
| 2013/0293222 A1 * | 11/2013 | Arnstein et al. | ......... 324/207.11 |

FOREIGN PATENT DOCUMENTS

| | | | |
|---|---|---|---|
| DE | 296 22 996 | | 11/1997 |
| JP | 01-175608 | | 7/1989 |
| JP | 4-262959 A | * | 4/1992 |
| JP | 06-131032 | | 5/1994 |
| JP | 2000-330641 | | 11/2000 |
| WO | 2011/018330 | | 2/2011 |

\* cited by examiner

*Primary Examiner* — Gregory Binda
(74) *Attorney, Agent, or Firm* — Kenyon & Kenyon LLP (57) ABSTRACT

A carrier ring for an encoder assembly includes a suspension device with resilient members. The encoder assembly includes a sensing device, such as a sensor head, for scanning directly toward a rotatable encoding member positioned on the carrier ring. The carrier ring is intended to be installed on a shaft of a machine.

35 Claims, 7 Drawing Sheets

CARRIER RING FOR AN ENCODER

CROSS-REFERENCE TO RELATED APPLICATIONS

The present application claims priority to Application No. 1250454-4, filed in the Kingdom of Sweden on May 4, 2012, which is expressly incorporated herein in its entirety by reference thereto.

FIELD OF THE INVENTION

The present invention relates to a carrier ring for an encoder.

BACKGROUND INFORMATION

Encoders are often used in environments where they are subjected to significant vibrations, and often in a heavily contaminated environment. The encoder may, for example, be used to generate the position values of shaft rotation in a machine. For example, the encoder may be attached to a rotating shaft in the machine. The encoding disk is caused to rotate as the shaft rotates, and the encoder casing and detector are firmly affixed to the casing of the machine.

Conventionally, an optoelectrical state encoder is used, which includes an encoding disk that has an optically readable pattern. The disk pattern is read by one or more sensor heads having at least one detector, which each deliver an electric signal in relation to the amount of light that is received in the detector, so that movement of the encoding disk in relation to the detector will be indicated by changes in the electric signal.

The encoding disk includes a periodic pattern, such as a plurality of reflective and non-reflective fields of mutually the same size, for example. When the encoding disk is turned or rotated, the change between and non-reflective fields can be detected and a change in angle thus determined.

Besides the use of optical/reflective encoders, there are also encoders for magnetic and inductive scanning.

However, when the shafts have very large diameters, such conventional encoders meet their limitations due to the need for specialized mounting, such as toothed belt arrangements, that are complicated and expensive. In addition, conventional encoders cannot be used for shaft ends that are inaccessible or for hollow shafts. Recently, magnetic encoders have been introduced in the market, including a magnetic tape that can be installed on large shafts more easily and inexpensively compared to conventional encoders. When a magnetic tape is used, a solid unseparated carrier ring is installed on the shaft, which carrier ring supports the magnetic tape. A sensor head for reading the magnetic tape is arranged with a small air gap close to the magnetic tape on the carrier ring that is arranged on the shaft. There is also similar equipment involved in magnetoresistive, optical/reflective and inductive scanning, including also the use of a sensor head for reading/scanning towards a carrier ring that is arranged on a shaft.

One problem with the use of magnetic, optical/reflective, and inductive encoders is still that it is difficult or even impossible to install the encoder equipment, and especially the carrier ring on a shaft. In some machines and applications, such as in wind turbines of a wind power plant, there is very little space for installations of additional equipment. The installation of an unseparated carrier ring on a shaft is dependent on the sequence of mounting of, for example, a wind turbine. In, for example, wind turbines, etc., there is also a need for keeping the weight as low as possible. Consequently, it is desirable to use light weight materials, such as light metals, for all additional equipment. When a carrier ring is mounted on a shaft in a machine, the ring has to be heated in order to mount the ring onto the shaft. A carrier ring mounted onto a shaft is screwed to a flange of the shaft. However, a shaft is often made of steel and when a carrier ring is installed by heating on the steel shaft there will be subsequent difficulties with alignment and straightening of the ring on the shaft due to different coefficients of thermal expansion of steel compared to a light metal. The problem with high stress still remains if there are materials involved having different coefficients of thermal expansion for the carrier ring and the shaft, although the carrier ring is fixed to a flange. It is important that the installation of the ring does not produce too much stress. It is a major problem and time consuming to adjust a conventional carrier ring when mounted on a shaft with conventional methods.

Usually the shaft has a form defect, for example, an oval shape or a polygon shape in a cross section of the shaft. Hence, the mounted carrier ring must be subsequently adjusted when mounted in place on the shaft, taken the form defect into consideration. With the installation of the carrier ring by heating onto the steel shaft according to conventional methods, and fixing the carrier ring to the flange of the shaft, the subsequent adjustment work to compensate for the form defect is time-consuming and troublesome.

In addition to the form defect, a position defect due to eccentricity of rotation between the carrier ring and the shaft is often present and that needs to be adjusted after mounting the carrier ring in place on the shaft. To correct for both a form defect and a position defect in an encoder, having a carrier ring installed in its position on a shaft, is complicated.

PCT International Published Patent Application No. WO 2011/018330 describes a pole wheel arrangement for a rotary encoder, wherein the pole wheel includes pole wheel segments.

SUMMARY

Example embodiments of the present invention provide a carrier ring for an encoder that, for example, eliminates the disadvantages associated with conventional arrangements, such as those described above. Example embodiments of the present invention provide a carrier ring for an encoder that is easy and uncomplicated to install, compared to conventional arrangements, and example embodiments of the present invention improve the adjustability of a carrier ring when mounted on a shaft.

According to example embodiments of the present invention, a carrier ring for an encoder includes a suspension device with resilient members.

Thus, a carrier ring that is easily installed and can be adjusted in an uncomplicated manner may be achieved. Due to the suspension properties of the carrier ring, heating of the carrier ring may no longer be necessary. A dimension of the inner periphery of carrier ring that is slightly larger than the shaft may be used, whereby it is possible to mount the ring onto the shaft without heating, and subsequently the resilient members of the suspension device of the carrier ring are adjusted such that the carrier ring is firmly attached on the shaft. Another advantage is that different materials for the shaft and the carrier ring may be used without any substantial difficulties with adjustment of the carrier ring when mounted on the shaft. Thus, the carrier ring may be clamped to the shaft. Example embodiments of the present invention may make it possible to produce inexpensive shafts since there is no longer a need to turn down a shaft in order to form a flange for attachment of a carrier ring.

Further features and aspects of example embodiments of the present invention are described in greater detail below with reference to the appended Figures.

DETAILED DESCRIPTION

Figure 1A:
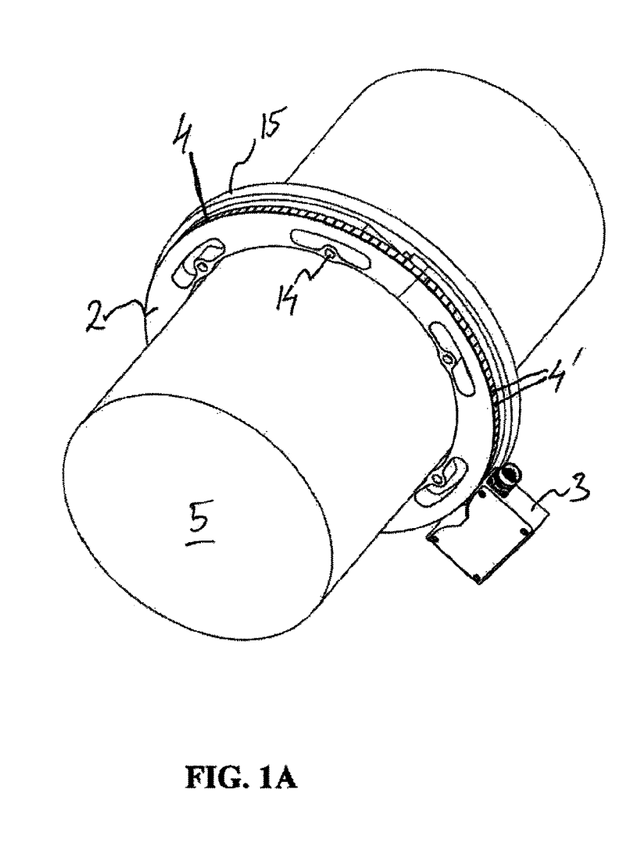
FIG. 1A is a schematic perspective view of an encoder assembly according to an example embodiment of the present invention.
Figure 1B:
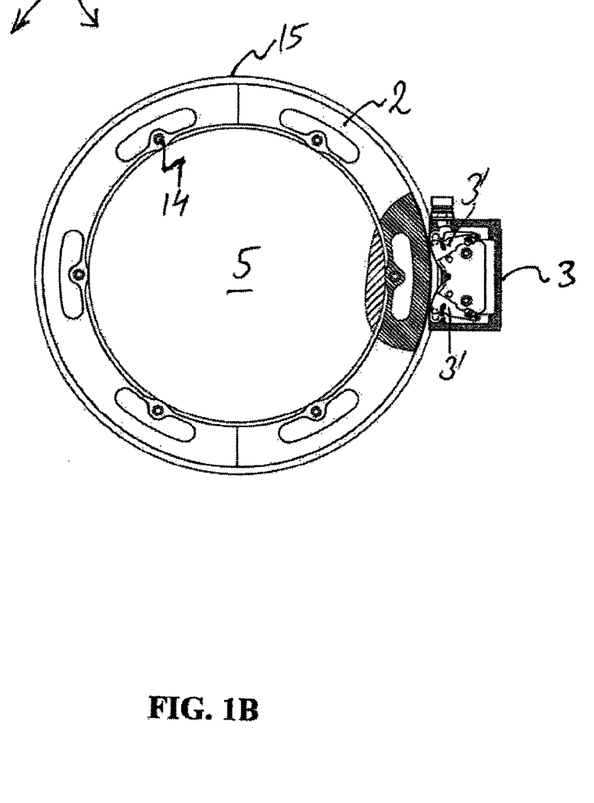
FIG. 1B is a schematic side view of the encoder assembly illustrated in FIG. 1A, in which a part of the carrier ring and the sensor head is illustrated in cross-section.

FIGS. 1A and 1B schematically illustrate a carrier ring 2 for an encoder assembly 1 in accordance with example embodiments of the present invention, suitable for magnetoresistive, magnetic, optical/reflective, or inductive scanning. The encoder assembly 1 also includes a sensing device 3, such as a sensor head with two adjustable detectors 3', for scanning directly toward a rotatable encoding member 4 positioned on the carrier ring 2. The carrier ring 2 is intended to be installed on a shaft 5 of a machine. Thus, the encoding member 4 is caused to rotate as the shaft 5 rotates. For example, in a magnetic encoder the encoding member 4 is a magnetic element(s), such as a magnetic tape with poles 4', carried directly on the carrier ring 2. The magnetic element(s) can also be, e.g., one or more magnets that are attached in plastics and molded onto a ring where it is magnetized. For all optical/reflective and inductive encoders having the similar configuration with rings and sensor heads, the same arrangement may be applicable.

The carrier ring 2 includes a suspension device with resilient members. According to the example embodiment described with reference to and illustrated in FIGS. 2 and 3, the resilient members 6, 6' are arranged as hollow, through openings 12. The through openings extend from one short side 13 of the ring to the other, and an axis, perpendicular to the plane of the paper, through a respective opening 12 extends in parallel to the ring rotational center axis C. For example, the openings 12 may have an oblong shape. In order to provide an effective resilient effect and adjustability of the carrier ring, it is suitable that the through openings 12 are arranged closer to the inner periphery 11 of the ring 2. Thus, a wall thickness t1 between the inner periphery 11 to the openings 12 is substantially smaller than a thickness t2 between the opening 12 and the outer periphery 9 of the ring.

The inner periphery 11 of the carrier ring 2 includes protrusions 10 which are fixed and intended as contact surfaces toward the shaft. According to the example embodiments illustrated in FIGS. 2 and 3, the protrusions 10 may be formed as discrete supporting points at the inner periphery 11 of the ring opposite each opening 12.

Figure 2:
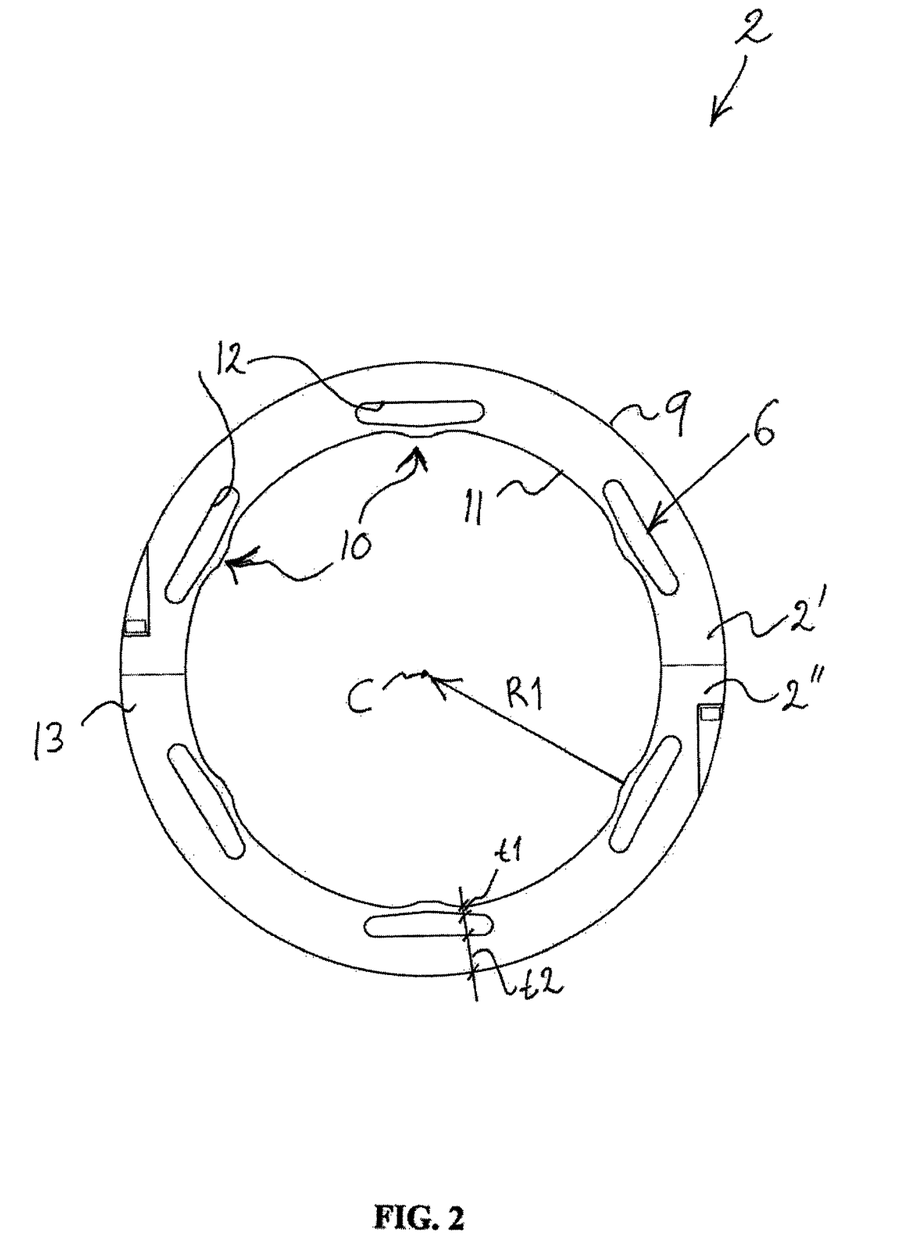
FIG. 2 is a schematic side view of a carrier ring for an encoder according to an example embodiment of the present invention.
Figure 3:
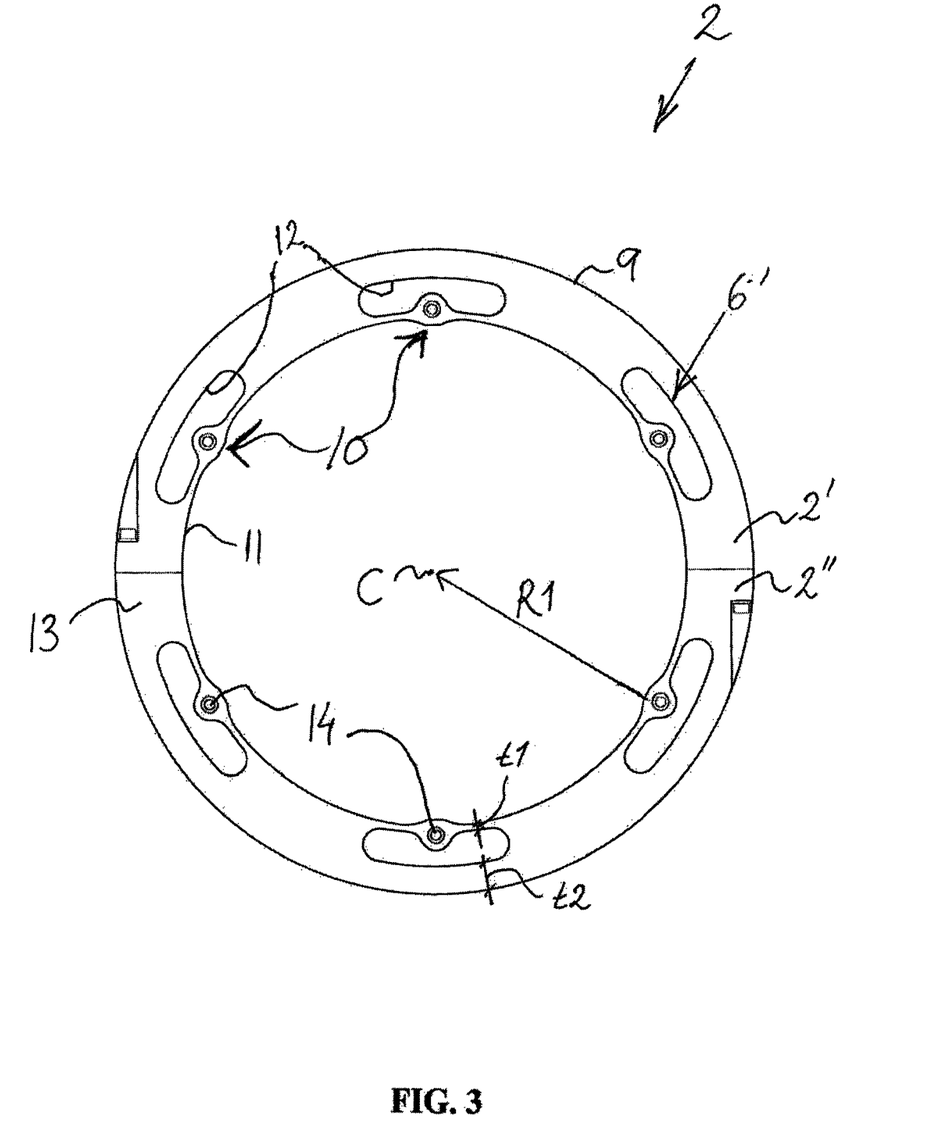
FIG. 3 is a schematic side view of a carrier ring for an encoder according to an example embodiment of the present invention.

In the example embodiments illustrated in FIGS. 2 and 3, adjustment elements may be arranged in connection with the resilient members 6, 6' in various alternative manners in order to alter the resilient action in each of the openings 12. An adjustment element may, for example, be an eccentric disk or pin which is placed in the opening. When the eccentric is affected by rotating the eccentric in the opening 12 to act against the surrounding walls in the openings 12, the thinner wall t1 between the inner periphery 11 and the openings 12 is resilient and will be bent in the direction R1 toward the central axis C of the ring 2. Conversely, when the eccentric is rotated such that it is not acting against the walls in the openings 12, the thinner wall t1 between the inner periphery 11 and the openings 12 will spring back. As described further below (with reference to, for example, FIGS. 4A and 4D), another alternative adjustment element can be a screw, bolt, etc., that is in connection with the thinner wall t1 between the inner periphery 11 to the openings 12 from the outside periphery 9 of the ring 2 via through openings (not shown in FIGS. 2 and 3) extending radially R1 with respect to the ring 2.

Thus, due to the suspension properties of the carrier ring 2, heating of the ring is no longer necessary for installation of the ring 2 on a shaft. It is sufficient to use a dimension of the inner periphery 11 of the ring 2 that is slightly larger than the shaft, whereby it is possible to mount the ring 2 onto the shaft without heating. Subsequently the resilient members 6, 6' of the carrier ring 2 are adjusted such that the ring is firmly attached on the shaft. Due to the configuration of the resilient members, different materials for a shaft and the carrier ring 2 may be used without any substantial difficulties with adjustment of the ring when mounted on a shaft.

According to the example embodiment described and shown with reference to FIG. 3, the same reference numbers as in the example embodiment illustrated FIG. 2 are used for the similar features. The difference in FIG. 3 compared to the example embodiment described above and illustrated in FIG. 2 is that the carrier ring 2 may also include attachment holes 14 as illustrated in the example embodiment of FIG. 3 (and also in the example embodiment illustrated in FIG. 1), for fixing the ring 2 towards a collar 15 (see, e.g., FIGS. 1A and 1B) of the shaft 5 of a machine.

Consequently, the resilient members 6, 6' according to the example embodiments illustrated in FIGS. 2 and 3 are formed integrally with the ring 2. In other words, the resilient members 6, 6' are formed unseparated and internal in the carrier ring 2. As a result, the cost may be reduced and the assembly to the shaft may be easier due to fewer parts.

In the example embodiments illustrated in FIGS. 4A to 4D, the resilient members 7, 7' and 8, 8' are not integrally formed with the ring 2. According to the example embodiment described and illustrated with reference to FIGS. 4A to 4D, the same reference numbers as in the example embodiment of FIGS. 2 and 3 are used for the similar features.

Figure 4A:
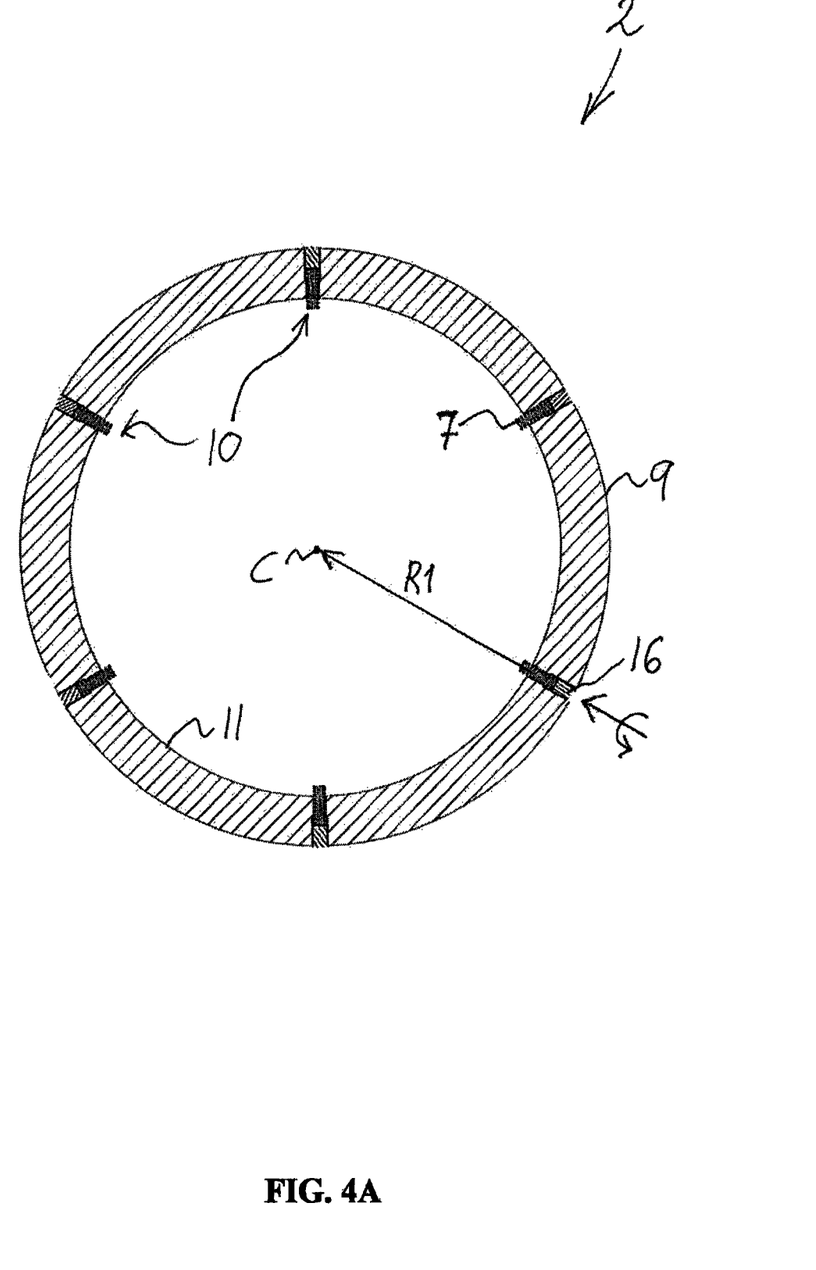
FIG. 4A is a schematic cross-sectional side view of a suspension device of a carrier ring for an encoder.
Figure 4B:
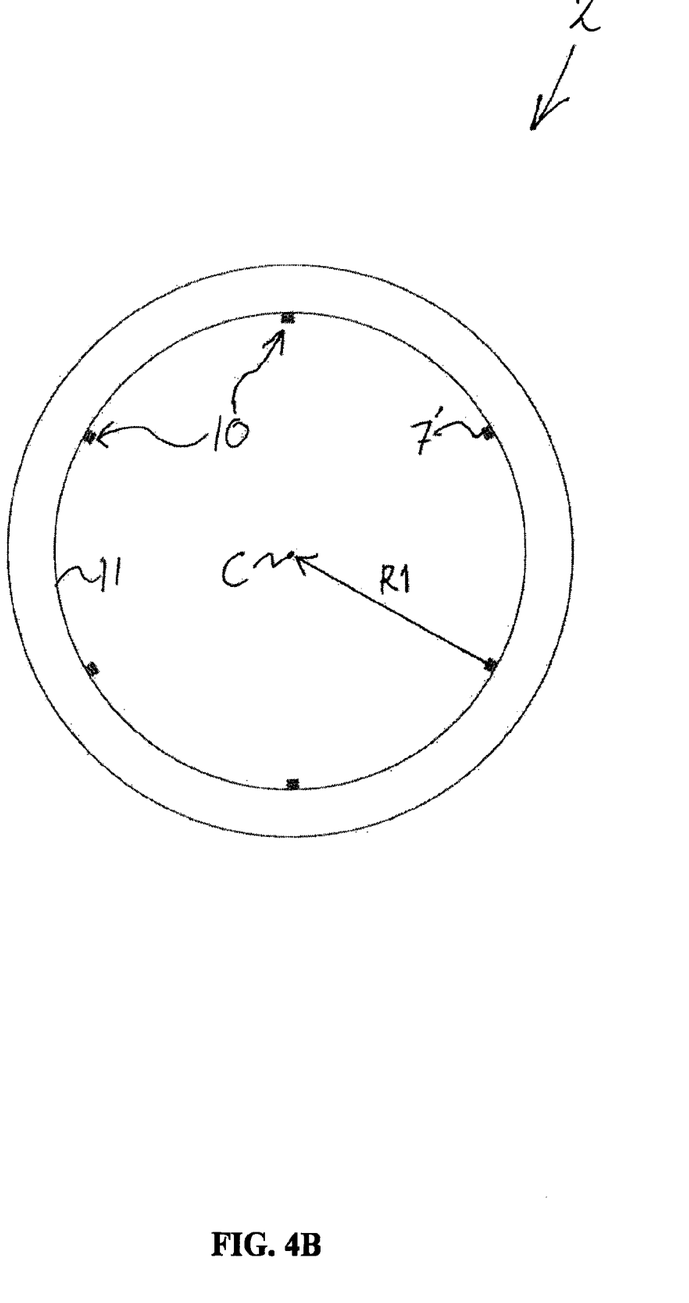
FIG. 4B is a schematic side view of a suspension device of a carrier ring for an encoder.

The resilient members may include coil springs 7, 7', as illustrated in FIGS. 4A and 4B. The coil springs 7' may be arranged at the inner periphery 11 of the ring 2 as illustrated in FIG. 4B. Alternatively, the coil springs 7 may be arranged in recesses at the inner periphery of the ring and partly extending out from the inner periphery 11 as illustrated in FIG. 4A. In the example embodiment illustrated in FIG. 4A, an adjustment device 16, such as an adjusting screw bolt, pin, etc., are in connection with the coil spring 7 from the outside periphery 9 of the ring 2 via through openings extending radially with respect to the ring 2.

Figure 4C:
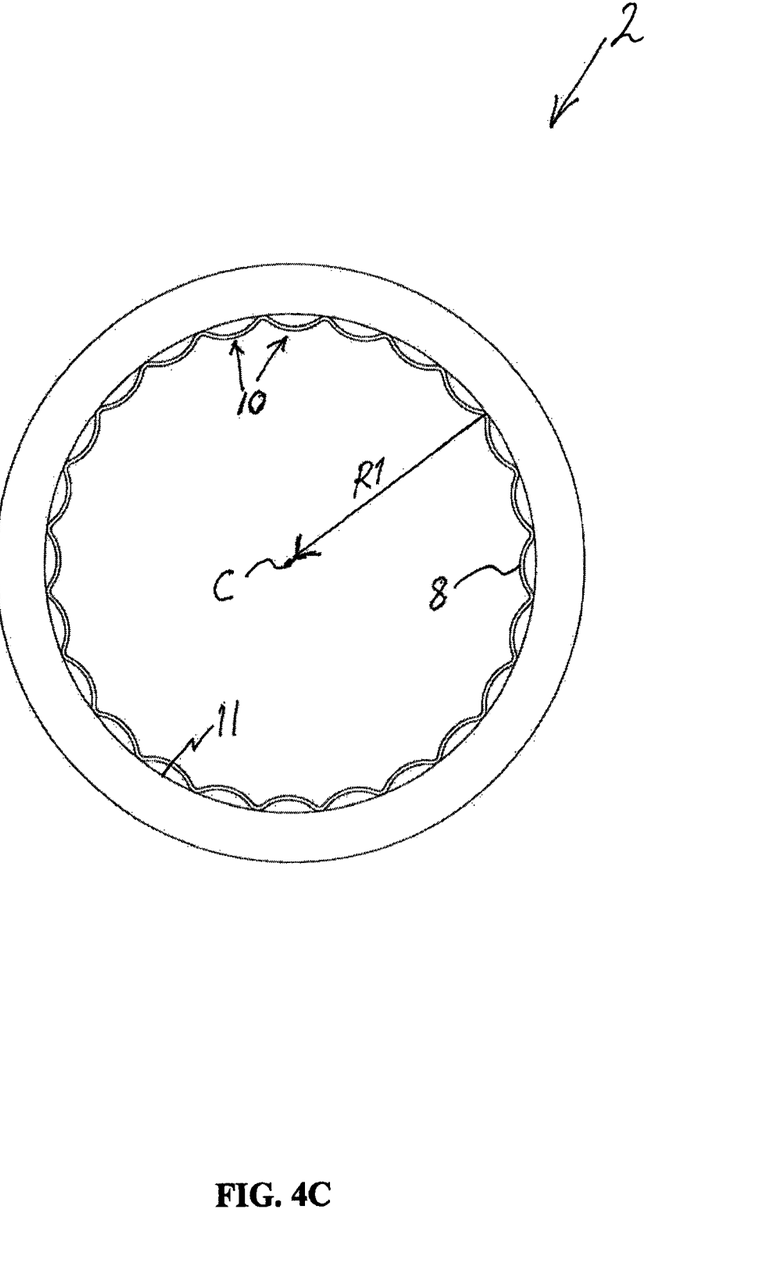
FIG. 4C is a schematic side view of a suspension device of a carrier ring for an encoder.
Figure 4D:
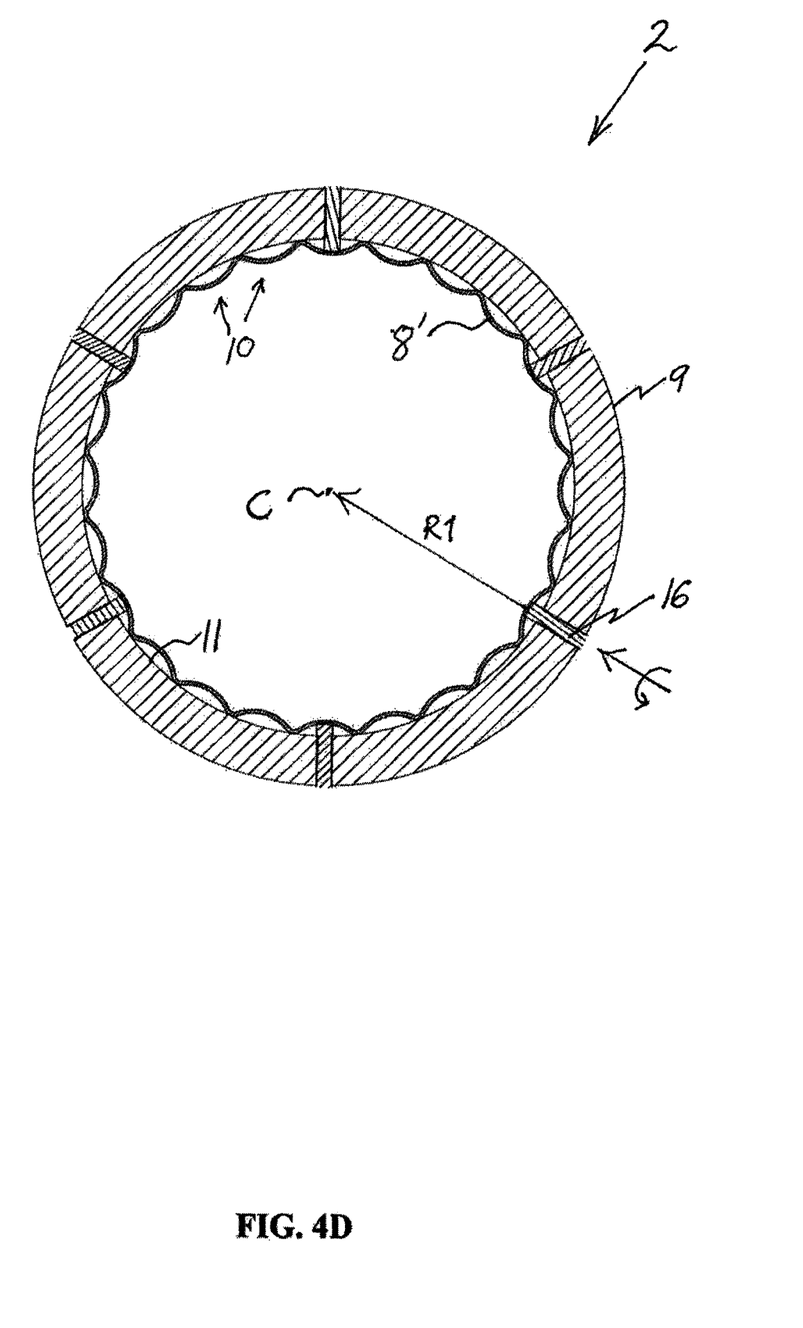
FIG. 4D is a schematic cross-sectional side view of a suspension device of a carrier ring for an encoder.

The resilient members may also be in the shape of a folded metal sheet 8, 8', as illustrated in FIGS. 4C and 4D, arranged at the inner periphery 11 of the ring 2. Adjustment device 16 may be in connection with the resilient members 8', adjustable from the outside periphery 9 of the ring 2 via through openings extending radially with respect to the ring 2.

Thus, the coil springs 7, 7' and the folded metal sheet 8, 8' in the example embodiments illustrated in FIGS. 4A to 4D, function as protrusions, in the similar manner as the protrusions 10 mentioned above with respect to FIGS. 2 and 3. The coil springs 7, 7' and the folded metal sheet 8, 8' are adjustable in the direction R1 towards the central axis C of the ring 2, when extending from the inner periphery 11 of the carrier ring 2

Further, the ring 2 is suitably divided and disconnectable in at least two sections 2', 2" as illustrated in FIGS. 2 and 3, which facilitates the installation on a shaft compared to a solid, unseparable ring. As a result, the divided ring 2 may be attached to the shaft 5 any time during production or assembly of a machine, and it is also easy to exchange or detach the ring for service. The requirements of roundness of the shaft can also be reduced, due to the arrangements described herein. Additionally, any form defect of the shaft may be compensated for. The carrier ring 2 may at least partially be made of a light metal or light metal alloy, the light metal(s) being, e.g., Al and/or Ti. The resilient members 6, 6', 7, 7', 8, 8' may be evenly spread circumferentially around the ring 2. Consequently, one advantage with the carrier ring described herein is that the variations of coefficient of thermal expansion of steel compared to a light metal may no longer be a problem. The number of resilient members 6, 6', 7, 7', 8, 8' is at least three, which is the minimum number of supporting points with resilient members in order for centering the carrier ring on a shaft. The number of resilient members 6, 6', 7, 7', 8, 8' may be, e.g., six or more.

What is claimed is:

1. A carrier ring for an encoder, comprising:
    a suspension device including resilient members;
    wherein the carrier ring is radially divided and is disconnectable in at least two sections such that the carrier ring is attachable around a shaft;
    wherein the resilient members are formed integrally with the carrier ring; and
    wherein the resilient members include through openings.

2. The carrier ring according to claim 1, wherein an inner periphery of the carrier ring includes protrusions that are fixed and/or adjustable in a direction toward a central axis of the carrier ring.

3. The carrier ring according to claim 1, wherein the carrier ring is at least partially formed of at least one of aluminium and titanium.

4. The carrier ring according to claim 1, wherein the openings have an oblong shape.

5. The carrier ring according to claim 1, wherein the openings are evenly spread circumferentially around the carrier ring.

6. The carrier ring according to claim 1, wherein the resilient members include at least three openings.

7. The carrier ring according to claim 1, wherein the carrier ring includes attachment holes adapted to fix the carrier ring toward a collar of a shaft.

8. A carrier ring for an encoder, comprising:
    a suspension device including resilient members;
    magnetoresistive, magnetic, optical/reflective, and/or inductive encoding members;
    wherein the carrier ring is radially divided and is disconnectable in at least two sections such that the carrier ring is attachable around a shaft.

9. The carrier ring according to claim 8, wherein an inner periphery of the carrier ring includes protrusions that are fixed and/or adjustable in a direction toward a central axis of the carrier ring.

10. The carrier ring according to claim 8, wherein the carrier ring is at least partially formed of at least one of aluminium and titanium.

11. The carrier ring according to claim 8, wherein the resilient members are formed integrally with the carrier ring.

12. The carrier ring according to claim 11, wherein the resilient members include through openings.

13. The carrier ring according to claim 12, wherein the openings have an oblong shape.

14. The carrier ring according to claim 12, wherein the openings are evenly spread circumferentially around the carrier ring.

15. The carrier ring according to claim 12, wherein the resilient members include at least three openings.

16. The carrier ring according to claim 8, wherein the carrier ring includes attachment holes adapted to fix the carrier ring toward a collar of a shaft.

17. The carrier ring according to claim 8, wherein the resilient members are formed non-integrally with the carrier ring.

18. The carrier ring according to claim 17, wherein the resilient members include coil springs, arranged at an inner periphery of the carrier ring.

19. The carrier ring according to claim 18, further comprising an adjustment device adapted to adjust the resilient members from an outside periphery of the carrier ring via through openings extending radially with respect to the carrier ring.

20. The carrier ring according to claim 17, wherein the resilient members are arranged as a folded metal sheet, arranged at an inner periphery of the carrier ring.

21. The carrier ring according to claim 20, further comprising an adjustment device adapted to adjust the resilient members from an outside periphery of the carrier ring via through openings extending radially with respect to the carrier ring.

22. An encoder system, comprising:
    a shaft;
    a sensing device; and
    a carrier ring mounted on the shaft, the carrier ring including encoding members scannable by the sensing device and a suspension device including resilient members;
    wherein the carrier ring is radially divided and is disconnectable in at least two sections such that the carrier ring is attachable around a shaft.

23. The encoder system according to claim 22, wherein an inner periphery of the carrier ring includes protrusions that are fixed and/or adjustable in a direction toward a central axis of the carrier ring.

24. The encoder system according to claim 22, wherein the carrier ring is at least partially formed of at least one of aluminium and titanium.

25. The encoder system according to claim 22, wherein the resilient members are formed integrally with the carrier ring.

26. The encoder system according to claim 25, wherein the resilient members include through openings.

27. The encoder system according to claim 26, wherein the openings have an oblong shape.

28. The encoder system according to claim 26, wherein the openings are evenly spread circumferentially around the carrier ring.

29. The encoder system according to claim 26, wherein the resilient members include at least three openings.

30. The encoder system according to claim 22, wherein the carrier ring includes attachment holes adapted to fix the carrier ring toward a collar of a shaft.

31. The encoder system according to claim 22, wherein the resilient members are formed non-integrally with the carrier ring.

32. The encoder system according to claim 31, wherein the resilient members include coil springs, arranged at an inner periphery of the carrier ring.

33. The encoder system according to claim 32, further comprising an adjustment device adapted to adjust the resilient members from an outside periphery of the carrier ring via through openings extending radially with respect to the carrier ring.

34. The encoder system according to claim 31, wherein the resilient members are arranged as a folded metal sheet, arranged at an inner periphery of the carrier ring.

35. The encoder system according to claim 34, further comprising an adjustment device adapted to adjust the resilient members from an outside periphery of the carrier ring via through openings extending radially with respect to the carrier ring.

* * * * *